United States Patent
Hotton et al.

(10) Patent No.: US 6,695,285 B1
(45) Date of Patent: Feb. 24, 2004

(54) BALL VALVE SEAT SEAL

(75) Inventors: Bruce A. Hotton, Montgomery, AL (US); Cal R. Brown, Lyndhurst, OH (US); George A. Carlson, Ravenna, OH (US); Joseph K. Iveljic, Willowick, OH (US); Jared S. Timko, Mentor, OH (US); Kevin J. Mracek, Madison, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 10/130,556

(22) PCT Filed: Nov. 21, 2000

(86) PCT No.: PCT/US00/32046
§ 371 (c)(1), (2), (4) Date: Oct. 21, 2002

(87) PCT Pub. No.: WO01/38761
PCT Pub. Date: May 31, 2001

Related U.S. Application Data

(60) Provisional application No. 60/167,173, filed on Nov. 23, 1999.

(51) Int. Cl.[7] ................................................. F16K 5/06
(52) U.S. Cl. .................... 251/315.01; 251/314; 251/359
(58) Field of Search ........................ 251/315.01–317.01

(56) References Cited

U.S. PATENT DOCUMENTS

| | | |
|---|---|---|
| 2,751,185 A | 6/1956 | Shand |
| 3,373,967 A | 3/1968 | Scaramucci |
| 3,428,292 A | 2/1969 | Scaramucci |
| 3,566,909 A | 3/1971 | Scaramucci |
| 3,647,179 A | 3/1972 | Scaramucci |
| 3,677,514 A | 7/1972 | Mencarelli |
| 3,981,482 A * | 9/1976 | Callahan, Jr. et al. ...... 251/315 |
| 4,023,773 A * | 5/1977 | Wise ........................... 251/315 |
| 4,258,900 A * | 3/1981 | Kindersley .................. 251/315 |
| 4,386,756 A | 6/1983 | Muchow |
| 4,410,165 A | 10/1983 | Koch et al. |
| 4,602,762 A | 7/1986 | Koch et al. |
| 4,934,656 A | 6/1990 | Groves et al. |
| 5,145,150 A * | 9/1992 | Brooks ........................ 251/315 |

FOREIGN PATENT DOCUMENTS

EP   0 774 090 B1   5/1997

* cited by examiner

*Primary Examiner*—Paul J. Hirsch
(74) *Attorney, Agent, or Firm*—Calfee, Halter and Griswold LLP

(57) ABSTRACT

A ball valve (10) includes a body (A) having a passageway (12) extending therethrough with a ball member (B) disposed in the passageway and mounted for selective rotation between valve open and valve closed positions to control fluid flow through the valve. A pair of flange grooves are provided in the body on opposite sides of the ball. each flange groove extending radially from the passageway. A pair of seat rings (16) are disposed in the passageway on opposite sides of the ball. Each seat ring has a first sealing surface (24) in contact with an outer surface of the ball and a radially extending annular flange or tab (30) received in an associated one of the flange grooves (34). The seat design further includes a pair of annular flange seals (18, 20) each disposed in a respective one of the flange grooves. The seat material is preferably made of a relatively harder and stiffer material compared to PTFE, such a PEEK The seat configuration achieves a cantilever effect to improve the temperature and pressure cycling performance of the valve. The flange seals are energized and made of an elastomer material or other suitable flexible seal materials having spring-like characteristics.

27 Claims, 3 Drawing Sheets

BALL VALVE SEAT SEAL

RELATED APPLICATIONS

This application claims the benefit of U.S. Provisional patent application Ser. No. 60/167,173 filed on Nov. 23, 1999 for BALL VALVE SEAT SEAL, the entire disclosure of which is fully incorporated herein by reference.

TECHNICAL FIELD OF THE INVENTION

The present invention relates to ball valves and more particularly to ball valve seat and seal designs using materials and configurations that increase the temperature and pressure performance of the ball valve.

BACKGROUND OF THE INVENTION

Ball valves are well known to those skilled in the art. One design that has met with substantial commercial success is the 60 Series ball valve manufactured and sold by Swagelok Company and as described in U.S. Pat. No. 4,410,165 (hereinafter the "'165 patent") and U.S. Pat. No. 4,602,762 the entire disclosures of which are fully incorporated herein by reference. This ball valve design is characterized by a number of features that improve the seal performance and cycle life of the valve. The valve includes a pair of seat assemblies each on an opposite side of the ball member. Each seat assembly includes a flexible seat ring, a support ring and a disc spring. The disc spring urges the seat ring into sealing engagement with an outer surface of the ball, and the support ring reduces inward axial displacement and deforming of the seat ring when the valve is under pressure. A significant feature of the ball valve is that the ball and seats are "floating" in that the ball can shift axially under pressure. The floating ball design avoids the need for trunnion style mounting or other costly alternatives.

SUMMARY OF THE INVENTION

In accordance with one embodiment of the invention, a ball valve includes a body having a passageway extending therethrough and a ball member disposed in the passageway and mounted for selective rotation between valve open and valve closed positions to control fluid flow through the valve. The valve body includes a pair of annular flange grooves on opposite sides of the ball, with each flange groove extending radially from the passageway. A pair of seat rings are disposed in the passageway on opposite sides of said ball. Each seat ring has a first sealing surface in contact with an outer surface of the ball and a radially extending annular flange or tab received in an associated one of the flange grooves. Each seat ring is spring loaded in the axial direction by a respective disc spring to load the first sealing surface against the ball. In accordance with one aspect of the invention, the seat peripheral flanges are held firmly in place such that the first sealing surface exhibits a cantilever type movement when the valve is under pressure. This prevents excessive axial displacement of the seat ring under pressure, and also allows the energized load applied to the seats to effectively re-seat the first sealing surface against the ball when the pressure returns to a lower value.

In accordance with another aspect of the invention, each seat ring is provided with the radially extending flange or tab that is axially compressed within a flange groove. The seat flange is configured to resist fluid pressure from two different directions, especially when the valve is under pressure and subjected to elevated temperature cycles. In a first embodiment, each seat flange is axially loaded by the resilient disc spring and by an energized resilient seal having spring-like characteristics disposed in the flange groove. The energized flange seal is used to provide a body seal and to maintain the body seal even after temperature cycling. The resilient flange seal may be fairly stiff such as a flexible graphite seal or a less stiff seal such as an elastomeric seal. The resilient flange seal is used primarily as a body seal. In an alternative embodiment, the disc spring may be omitted with the energized flange seal being used to apply a sufficient active load on the seat flange.

In accordance with another aspect of the invention, a ball valve seat ring is provided of PEEK or other relatively harder and stiffer plastic material compared to PTFE to increase the temperature and pressure performance of the valve.

These and other aspects and advantages of the present invention will be apparent to anyone skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1:
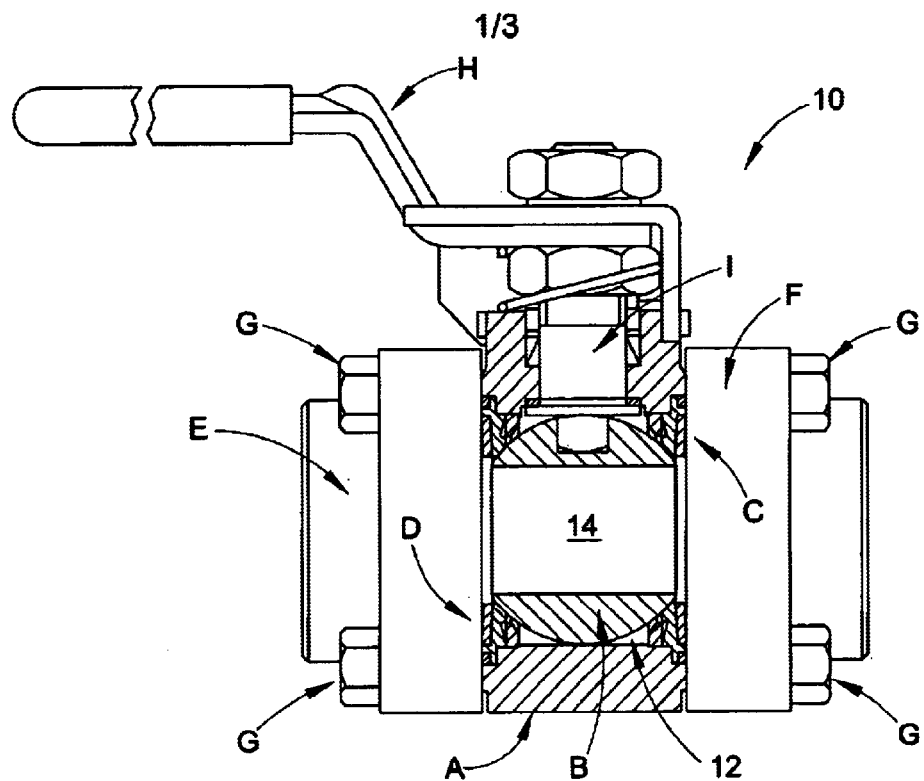
FIG. 1 is a ball valve in accordance with an embodiment of the invention, shown in elevation and partial cross-section.

With reference to FIGS. 1–4, a ball valve assembly is generally indicated by the reference numeral 10. The valve assembly 10 in this exemplary embodiment is a floating ball design in which the ball is captured between two flexible seat rings, such as, for example, the ball valve design illustrated and described in the '165 patent. Most of the elements of the ball valve assembly 10 are conventional and may be, for example, the same as described in the '165 patent and the details thereof need not be repeated herein. The present invention is directed to improvements in the design of specific elements such as the seat ring and associated seals, and these modifications will be described in detail herein. Those skilled in the art will appreciate, however, that the improvements described herein will have application to other ball valve designs and are not limited to use with a ball valve as described in the '165 patent.

With reference to FIG. 1 then, the ball valve assembly 10 includes a ball valve body A with a ball valve member B disposed in a central passageway 12 in the valve body A. The ball member B is mounted for selective rotation between a valve open position as illustrated in the various views, and a valve closed position (not shown). A pair of seat assemblies C and D are provided in the central passageway 12 on opposite sides of the ball member B. The ball member B and the seat assemblies C and D are enclosed within the valve ball body A by a pair of opposed end fittings E and F. The end fittings E and F are mounted to the valve body A by any convenient device, in this example a number of mounting bolts G.

A stem assembly I and actuating handle assembly H are used to actuate the valve 10. The stem assembly I is connected to the handle assembly H and also helps support the ball member B in the valve body A, the details of which are fully described in the '165 patent. As explained in the '165 patent, the ball member B is supported in the passageway 12 such that the ball member B can shift axially (referenced to the longitudinal axis of fluid flow through the ball B) within the passageway 12 when the valve 10 is under pressure, such as, for example, when the valve is closed. The valve 10 may be manually actuated with the handle H, or alternatively the valve 10 may have an actuator mounted thereon as is known.

Figure 2:
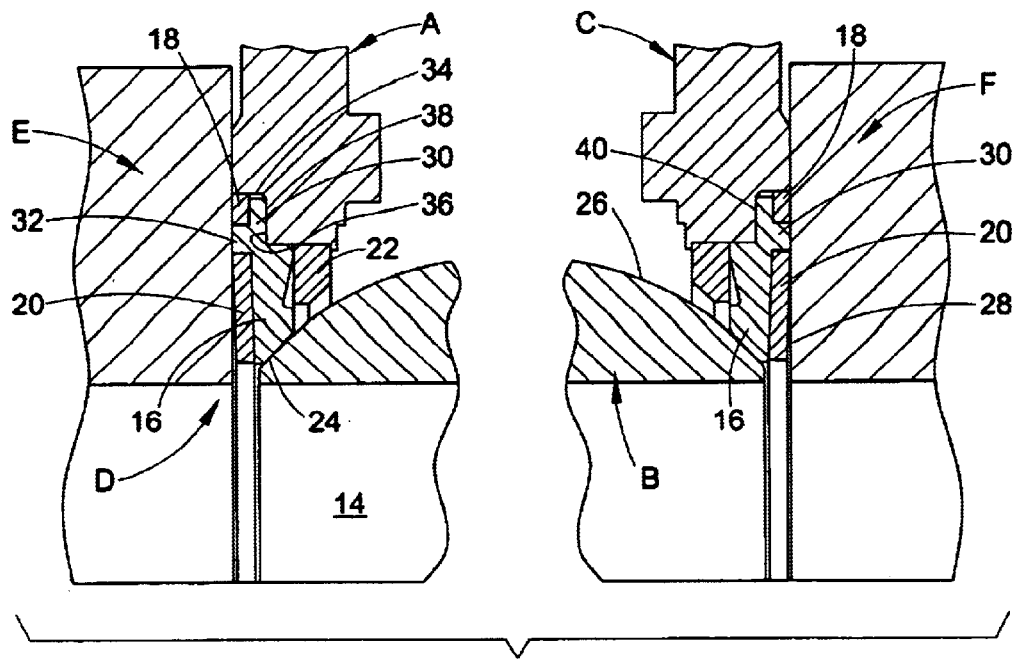
FIG. 2 is a more detailed view of the ball member and seat assemblies of the embodiment of FIG. 1 in an assembled condition.

The present invention is related to a number of modifications in the seat assemblies C and D as compared to the corresponding structures in the '165 patent. FIG. 2 illustrates the ball member B and seat assemblies C and D of FIG. 1 in an enlarged view. In FIG. 2 the stem assembly I has been omitted for clarity and ease of illustration of the seat assemblies C and D. The central passageway 12 is generally cylindrical and is just slightly greater in diameter than the ball member B. The ball member B includes a fluid flow opening 14 that in the valve open position such as illustrated in FIG. 2 is aligned with fluid inlet and outlet ports in the end fittings E and F.

The seat assemblies C and D are substantially identical and therefore will be singly described. Each seat assembly includes three basic components, namely a seat ring 16, a flange seal 18 and a resilient force generating member 20 such as, for example, a disc spring 20. Any suitable element may be used to apply the energized load against the seat ring 16. A support or reinforcing ring 22 may also be used. The disc spring 20 and the support ring 22 are substantially the same in structure and function as described in the '165 patent and that description is not repeated herein. In some applications, a stronger disc spring may be used to assure that the seat ring 16 sealingly engages the ball member B after temperature and/or pressure cycling. For the present invention, it is sufficient to understand that the disc spring 20 operates to bias or force a seal surface 24 (see FIG. 3) of the associated the seat ring 16 against the outer surface 26 of the ball member B. As will be further explained hereinafter, in the illustrated embodiment, the disc spring 20 also applies an energized axial load against the seat flange 30.

Figure 4:
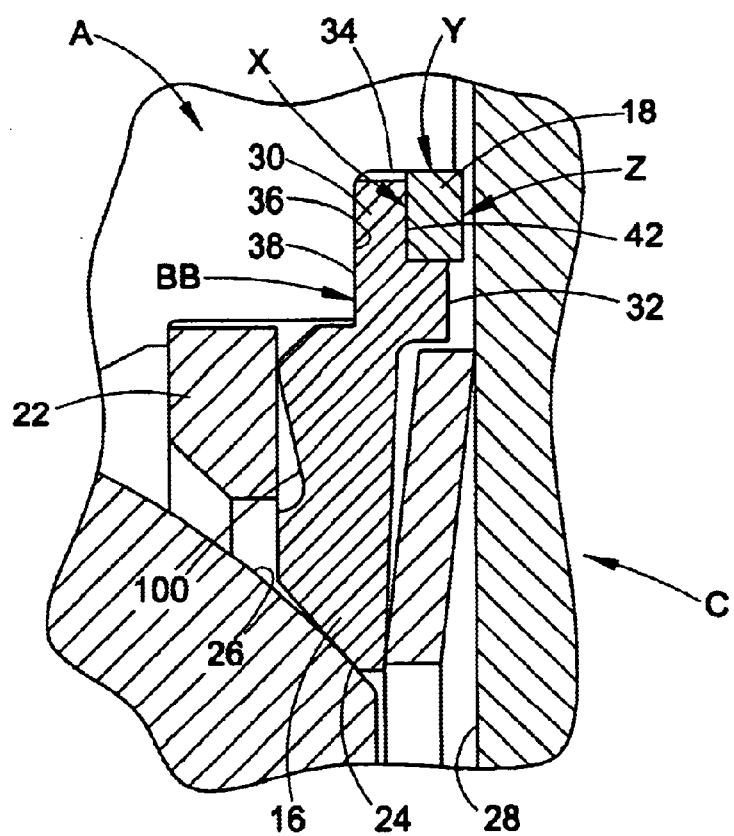
FIG. 4 illustrates an enlarged view of the seat ring and flange seal assembly in a less than fully assembled condition.
Figure 5:
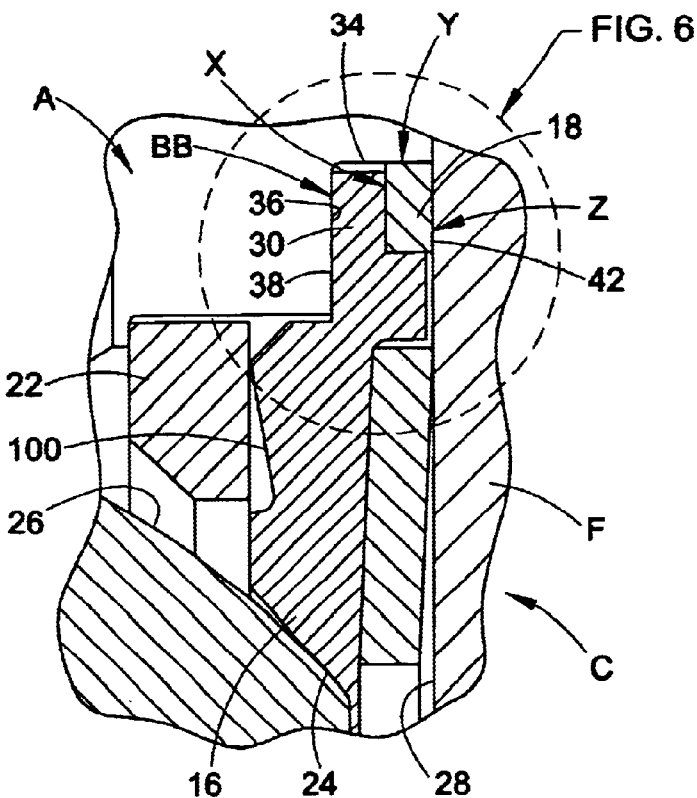
FIG. 5 illustrates an enlarged view of the seat ring and flange seal assembly in a fully assembled condition.

FIGS. 4 and 5 illustrate a further enlarged view of the seat assembly arrangement C in accordance with this first embodiment of the invention. FIG. 5 illustrates the components in a fully assembled condition and FIG. 4 illustrates the components with the valve nearly fully assembled but without a full axial compression of the seat assembly C. The end fitting F provides an inner shoulder 28 that faces the disc spring 20, an annular flange 30 of the seat ring 16 and the flange seal 18. The end fitting F thus captures and axially compresses the seat assembly C in the central passageway 12 and in sealing engagement with the ball member B.

The seat ring 16 is a generally disc shaped or ring-like member having a radially inward annular sealing surface 24 in contact with the ball member outer surface 26. The seat ring 16 further includes a radially and axially extending annular outer circumferential flange or tab 30. The flange 30 is closely received in a counterbore 34 formed in the valve body A. The counterbore 34 forms a shoulder 36 that supports a first axial face 38 of the radial flange 30. An axially extending portion 32 of the flange 30 faces and abuts the end fitting shoulder 28 without axial compression of the flange 30. In other words, when fully assembled, it is intended that there be a gap of about 0.0–0.4 in. between the face of the extension 32 and the fitting shoulder 28 so that no appreciable axial compression is applied directly to the flange 30 by the shoulder 28, yet the flange 30 is fully captured and constrained against axial displacement as will be described herein.

Figure 6:
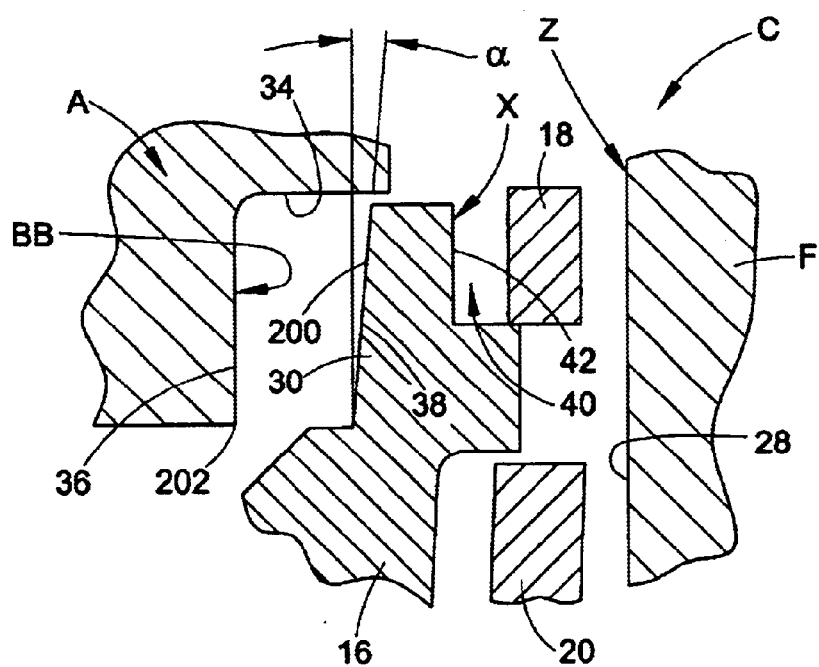
FIG. 6 is an enlarged exploded view of the circled region of FIG. 5.

The flange 30 is also formed with a circumferentially continuous notch or recess 40 (FIG. 6). The flange seal 18 is disposed within the flange recess 40. As best illustrated in FIG. 4, the resilient seal 18 is typically oversized so as to extend axially beyond the flange extension 32. The disc spring 20 partially extends axially beyond the extension 32 so that the disc spring 20 and the resilient seal 18 are axially compressed during assembly without an axial compression being directly applied to the flange 30 by the fitting shoulder 28. In this manner, all of the axial compressive load applied to the flange 30 is a resilient dynamic load applied by the disc spring 20 and the resilient seal 18, with substantially no static load applied to the flange 30.

Figure 3:
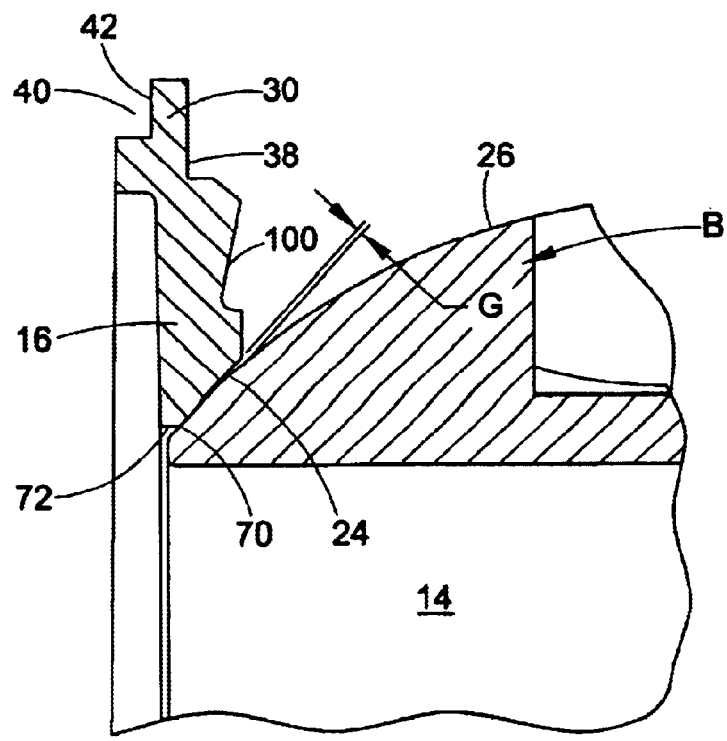
FIG. 3 is a partial view in section of a seat ring used in the valve of FIGS. 1–3, showing the contact between the seat ring and the ball member.

When the valve 10 is fully assembled as illustrated in FIGS. 1–3, each flange 30 is disposed in a flange groove defined by the surfaces 28, 34 and 36 of the assembled valve (see FIG. 5). The flange 30 is axially captured between the fitting shoulder 28 and the counterbore shoulder 36 with a resilient load applied thereto by the disc spring 20 and the resilient seal 18. The flange seal 18 is axially compressed between the end fitting shoulder 28 and a second axial face 42 of the flange 30. Because the seat rings 16 are preferably made of a stiffer and harder plastic material such as PEEK, the flange seal 18 is preferably made of a resilient material that produces an energized seal between the flange 30 and the valve body A and end fittings E and F.

The flange seal 18 may be made of any suitable resilient energized material, and preferably is made of an elastomeric material or a stiffer seal material with spring-like characteristics such as flexible graphite (e.g. Grafoil ™), Other suitable materials include but are not limited to metal o-rings, C-seals and so forth. In the embodiment of FIGS. 1–3, the seal 18 is a Grafoil™ type seal. Thus, as used herein, the terms "energized" and "resilient" are used interchangeably to convey the concept that the seal 18 provides an energized body seal and an energized axial load against the flange 30. The seal 18 need only be flexible or resilient enough to provide a resilient energized seal that withstands temperature cycling of the valve 10. Thus a fairly stiff material such as flexible graphite for example is suitable for the seal 18.

With reference to FIG. 4, as contrasted with the geometry and configuration of the prior art seats such as, for example, in the '165 patent, the seat ring 16 has been thinned in its axial dimension generally between its outer diameter and its inner diameter by removing material. In the embodiment of FIGS. 1–4, the seat 16 includes a notch 100. This notch 100 is circumferentially continuous though it need not be. An important aspect of this feature of the invention is that the seat 16 is configured so as to increase its flexibility in the axial direction. In other words, by thinning or contouring the central body of the seat 16, the inner portion of the seat 16 that forms the seal surface 24 is urged into sealing contact with the outer surface 26 of the ball member B by the disc spring 20. When the valve 10 is under low pressure, this sealing contact is preferably but not necessarily a near line contact seal with the ball surface 26.

The new seat ring configuration is particularly useful for making the seat ring 16 out of a relatively harder and stiffer thermoplastic material such as polyetheretherketone (PEEK), as compared to the seat ring design of the '165 patent that is made of a relatively softer plastic material such as PTFE (Teflon™). Other materials besides PEEK may be used including but not limited to polyamide-imide (e.g. Torlon™), polyimide (e.g. Vespel™), pole vinylidene-fluoride (e.g. Kynar™) and polychlorotrifluoroethylene (e.g. Kel-F™) and reinforced PTFE (for example, glass or carbon filled PTFE). In general, it is preferred that the seat ring material have a Young's Modulus property or stiffness characteristic that is higher than that of a softer material such as PTFE. More preferably, the seat material has a Young's Modulus that is about ten times higher than the Young's Modulus of a softer material such as PTFE. Still more preferably, the seat material has a Young's Modulus of about 400,000 to 600,000 psi. The use of PEEK, for example, increases the high temperature performance for the ball valve 10 as compared to the use of a material such as PTFE. However, PEEK is a substantially harder and stiffer material compared to PTFE, and therefore the energized flange seal 18 is provided to assure that an adequate valve body seal is maintained after temperature cycling.

The captured and axially compressed flange 30 restricts and substantially prevents free axial sliding movement of the seat ring 16 in response to pressure across the valve ports. Furthermore, the seat ring seal surface 24 engages the ball surface 26 under force of the disc spring 20. The disc spring 20 imparts maximum axial force to the seat ring 16 from the radially innermost edge 70 of the seat ring sealing surface 24. The spring 20 force exerted on the seat 16 to provide the ball seal decreases radially outward. The ball diameter, seat ring and spring are appropriately sized so that as the valve is assembled the seat ring 16 is flexed to produce an excellent sealing contact seal between the seat 16 and the ball B.

The clamped flange 30 of the present invention provides a rigid pivot region or pivot point about which flexure of the seat ring 16 can occur while limiting the axial displacement of the seat ring 16 under pressure. The radially inner portion of the seat 16 that forms the seal surface 24 is flexible from the pivot point in a cantilever type fashion. This flexibility is enhanced by the removal of seat material from the notch 100. Thus the disc spring 20 can more effectively exert a force against the seat ring 16 to assure good sealing contact between the seat ring seal surface 24 and the ball surface 26. This is particularly beneficial when a harder and stiffer plastic material such as PEEK is used for the seat ring.

With the seat flange 30 rigidly clamped, the seat assembly D is restricted from axial displacement (though there may still be some axial flexing) when the valve 10 is under pressure. This restricted axial movement substantially reduces or eliminates excessive loads and stresses from being applied to the downstream seat 16. By reducing the stress on the seats 16, the seats 16 will not plastically deform particularly under increased temperature. This assures that when the pressure and or temperature return to ambient, the disc springs 20 will be able to urge the seats 16 into excellent sealing condition with the ball B. Thus, the new seat assemblies C and D along with the use of harder materials (PEEK in this embodiment) significantly improve the performance of the valve under repeated temperature and pressure cycling.

The cantilever effect of the clamped flange 30 along with the flexible geometry of the seat 16 provides additional performance improvements. The stiffness of the cantilever design increases the force of the seat ring 16 on the ball B to generate contact pressure between the seal surface 24 and the ball surface 26 that is greater than the force generated by the disc springs 20 alone. Additionally, the cantilever configuration controls orientation of the spherical sealing surface 24 on the seat 16. The cantilever function allows the seat 16 to flex under high pressure and/or temperature to give full face contact between the ball B and the downstream seat. This distributes the load on the downstream seat and reduces deformation. When the pressure is removed, the downstream seat 16 pivots back (in cantilever fashion) to its original shape under force of the spring 20 and re-establishes its original sealing contact with the ball B. This enhances the capability of the seats 16 to seal against the ball B under low pressure after thermal cycling. Additionally, since the cantilever action is fixed between the body and the flange at a clamped pivot point, the upstream seat 16 bends instead of sliding downstream in response to upstream pressure. Thus, some of the load of the upstream seat created by pressure on the back face of the upstream seat is transferred to the valve body instead of the ball B. This results in less load being transferred from the ball to the downstream seat. The clamped flange 30 reduces the effective diameter of the upstream seat under pressure, thus reducing the force transmitted through the ball to the downstream seat. The support rings 22 also take up some of the load from the upstream seat under pressure by reducing the effective diameter of the seat 16 when it pivots under pressure, thereby further reducing the load that would otherwise be transferred to the downstream seat through the ball.

The seat ring flange 30, in cooperation with the end fitting shoulder 28, also encapsulates the flange seal 18. In this exemplary arrangement, the seal 18 is isolated from those portions of the seat ring 16 that tend to flex, bend and move during temperature and pressure cycling. In other words, the seat 16 is stationary vis-a-vis the resilient seal 18 even when the main portion of the seat 16 is moving or flexing due to the cantilever design. By securing the flange seal 18 in an isolated fixed position away from such flexure regions, the flange seal 18 cannot extrude into these gaps and become damaged. Those skilled in the art, however, will appreciate that the particular location and fit of the energized seal 18 with the seat seal 16 may be adapted for a specific ball valve design.

With continued reference to FIGS. 4, 5 and 6, for a seat ring 16 made of PEEK material or comparable harder and stiffer plastic material compared to PTFE for example, the flange seal 18 is intended to form a primary and outer body seal at two faces, X and Z, and to reduce the effects of higher temperature cycling on the seat 16. The axial compression of the flange seal 18 between the shoulder 28 and the flange second axial face 42 assures a good body seal along the radially extending faces X and Z to prevent fluid under pressure from leaking. The resilient seal 18 may also form a secondary or backup seal at the surface Y, particularly when the seal 18 is made of a stiffer material such as flexible graphite.

It will be appreciated by those skilled in the art that the secondary peripheral seal Y of the present invention may be advantageous when the seat ring 16 is made of a harder and stiffer material such as PEEK. For example, if the design of the '165 patent were modified to use PEEK as the seat ring material, the o-ring designated 82 in the '165 patent would have to provide a radially inward seal at the outer circumferential surface of the seat ring. This seal location was not required in the '165 patent because the seat ring was made of PTFE which provided an adequate seal at the flanges 140, 142. However, trying to seal along the outer circumferential surface of the '165 seat ring is difficult because system pressure tends to push the O-ring radially away from the seat ring.

With particular reference to FIG. 6 and in accordance with another aspect of the invention, the seat flange 30 includes a generally axial inward face 200 that is axially compressed against the counterbore 36 when the valve 10 is fully assembled. The inward face 200 forms an inner body seal with the surface BB of the counterbore 34 radial shoulder 36. This seal is excellent at cryogenic temperatures and lower pressures. However, we have found that the seal performance is substantially enhanced by including a radial taper angle a to the face 200. This taper causes a corner 202 of the valve body A to initially be axially compressed into the seat 16 as the valve is assembled. As the fittings E, F are further tightened onto the valve body A, the flange 30 pivots somewhat about the body corner 202 and abuts and is compressed against the surface BB. The flange 30 thus is somewhat bent about the corner 202 to form an increased stress or compression seal between the corner 202 and the seat 16. This produces an excellent primary inner body seal even when the valve is subjected to temperature and pressure cycles.

It will be appreciated by those skilled in the art that the corner 202 seal reduces the seal strength required along the surface Y by the flange seal 18. When the flange seal 18 is highly resilient such as an elastomer, fluid pressure from fluid getting past the surface BB could in some cases push the seal 18 away from the surface Y. This effect would be less pronounced when the flange seal 18 is made of a stiffer material, such as a flexible graphite material. Nonetheless, even when such a stiffer energized seal 18 is used, it is preferred, although not required in all applications, to form a primary seal at the corner 202. This seal significantly improves the seal performance under pressure.

In accordance with this aspect of the invention then, the corner 202 seal is also an energized seal due to the energized force applied to the flange 30 by the disc spring 20 and the resilient seal 18. In some applications, particularly with a stiffer resilient seal 18, the disc spring 20 may be omitted (provided there is sufficient compression of the seat 16 against the ball B) if the flange seal 18 applies a sufficient energized axial load of the flange 30 against the corner 202. Furthermore, the primary inner body seal does not necessarily have to be produced at the corner 202, but rather may be formed anywhere along the surface BB that defines the counterbore 34. This seal can be effected by simply applying sufficient axial compression of the flange 30 against the counterbore 34 surface, either using the resilient seal 18 the disc spring 20 or both. As a further alternative, a stiffer seal 18 such as flexible graphite, may be used in some applications to effectively seal at all three surfaces X, Y and Z, thus eliminating the need to form the corner 202 seal or a primary seal along the counterbore 34 surface BB. These alternative embodiments thus may eliminate the need for the tapered surface 200 of the flange 30.

Thus, the new seat seal assembly 16, 18 is effective to seal against fluid pressure from two directions, namely inner fluid pressure that reaches the corner 202 and outer fluid pressure at the shoulder 28. This is accomplished in the illustrated embodiment by the inner body seal at the corner 202 and the outer body seal effected by the energized seal 18. The energized flange seal 18 provides excellent seals at the surfaces X and Z even with high temperature cycling of the valve, and the corner 202 seal provides an excellent seal with the valve 10 under pressure. Note that the energized resilient flange seal 18 also may improve the seal performance under pressure because fluid pressure along the surface 28 will tend to force the flange seal 18 radially against the surface Y as a secondary seal for the corner 202 seal.

With reference to FIG. 3, the seat ring 16 includes an inward facing seal surface 24 that contacts the outer surface 26 of the ball member B. The ball engaging surface 24 is generally spherical in shape with a radius of curvature in the unassembled state that is greater than the radius of curvature of the ball member B outer surface 26. In this respect, the shape of the surface 24 is similar to the seat ring seal surface 136 of the '165 patent. The seat ring 16 is designed to exhibit a spring-like elasticity to exert a sealing force against the ball surface 26. This is accomplished by having the seat surface 24 distort or flex axially outward when the seat ring is axially compressed between the ball surface 26 and the disc spring 20 during assembly. Initially, the seat ring 16 contacts the ball surface 26 along the inner rim 70 of the seal surface 24. The rim 70 is defined by the inner axial edge of a cylindrical surface 72 that forms a fluid passage through the seat ring. This fluid passage circumferentially surrounds the flow opening 14 in the ball member.

As noted in the '165 patent, and in particular with respect to FIG. 4 thereof, when the seat material is a softer plastic such as PTFE, for example, there is an initial gap "g" that is present during the initial assembly of the valve. This gap closes when the valve is fully assembled so that there is full surface contact between the PTFE seat surface 136 and the ball outer surface. However, as shown in FIG. 3 of the present disclosure, and in accordance with one aspect of the present invention, when the seat ring 16 is made of a harder and stiffer material such as PEEK, for example, there is an initial gap G between the seat seal surface 24 and the ball surface 26 but this gap G is preferably still present even after the valve is fully assembled. The cantilever design and flexibility of the seat with the harder material, along with a stiffer spring 20, assures that after pressure and/or temperature cycling the seat 16 can substantially return to having its original sealing contact with the ball surface 26.

Those skilled in the art will appreciate that the new seat seal design herein may also be used with seats made of softer materials such as PTFE, although the advantages of the flange design are more significant with harder stiffer materials such as PEEK.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

What is claimed is:

1. A ball valve comprising:

a body having a passageway extending there through;

a ball member disposed in said passageway and mounted for selective rotation between valve open and valve closed positions to control fluid flow through the valve;

a pair of flange grooves in said body on opposite sides of said ball, each said flange groove extending radially from said passageway;

a pair of seat rings in said passageway on opposite sides of said ball;

each seat ring having a first sealing surface in contact with an outer surface of said ball;

each seat ring having a radially extending annular flange received in an associated one of said flange grooves; and a pair of annular flange seals each disposed in a respective one of said flange grooves;

wherein each of said radially extending annular flanges are captured between the valve body and a fitting shoulder and each of said seat rind seal surfaces are spaced from said fitting shoulder thereby allowing the seat rings to flex under pressure.

2. The valve of claim 1 wherein said flange seal comprises an elastomeric material.

3. The valve of claim 1 wherein said flange seal comprises an o-ring.

4. The valve of claim 1 wherein said flange seal comprises an energized resilient seal with spring-like characteristics.

5. The valve of claim 1 wherein said seat rings comprise a relatively harder and stiffer thermoplastic material compared to PTFE.

6. The valve of claim 5 wherein said seat rings comprise PEEK.

7. The valve of claim 1 wherein each said flange and flange seal is axially compressed in said flange groove.

8. The valve of claim 7 wherein each said flange is axially compressed to form a seal between said flange and said body.

9. The valve of claim 7 wherein each said flange is radially tapered so that under axial compression said flange forms a primary seal at a corner in said flange groove.

10. The valve of claim 7 wherein each said flange seal provides a secondary radial seal along its outer perimeter.

11. The valve of claim 10 wherein each said flange seal forms axial seals against said flange and said valve body.

12. The valve of claim 1 wherein said seat ring flanges are axially compressed in said flange grooves and limit axial movement of said seat rings when the valve is under pressure.

13. The valve of claim 12 wherein each said flange seal is disposed in a recess of a respective flange and separated from said passageway by said seat ring flange.

14. The valve of claim 13 wherein each said seat ring flange comprises a circumferential recess, said respective flange seal being disposed in said flange recess.

15. The valve of claim 14 wherein said circumferential flange recess is formed along an outer perimeter of said flange; and wherein said flange seal has an axial dimension greater than an axial dimension of said recess so that said flange seal is axially compressed when the valve is assembled to apply an energized load against said flange.

16. The valve of claim 1 wherein each said seat flange seal comprises flexible graphite.

17. In a ball valve of the type comprising a rotatable ball member disposed in a fluid passageway of a valve body and a pair of seat rings each having a central main body that is respectively compressed against opposite sides of the ball member, the improvement comprising:

each seat ring comprising a flange that extends radially from said main body; and a flange seal comprising a resilient material that is axially compressed with said flange to form an energized body seal; wherein said flange forms seal points against the valve body and the flange seal and said flange seal forms seal points against the flange and a fitting shoulder.

18. The valve of claim 17 further comprising a resilient force applying member that applies an axial load against said flange to form a second energized body seal.

19. The valve of claim 18 wherein each flange is bent around a corner of said valve body to form a high compression inner body seal.

20. The valve of claim 19 wherein said flange seal provides an outer body seal.

21. The valve of claim 17 wherein said flange seal comprises a material that is different from a material that forms said flange.

22. The valve of claim 17 wherein said flange seal comprises an elastomer.

23. The valve of claim 17 wherein said flange seal comprises flexible graphite.

24. The valve of claim 17 wherein said seat comprises a material that is relatively stiffer and harder compared to PTFM.

25. In a ball valve of the type comprising a rotatable ball member disposed in a fluid passageway of a valve body and a pair of seat rings each having a central main body that is respectively compressed against opposite sides of the ball member, the improvement comprising: each seat ring comprising a material that is substantially stiffer and harder compared to PTFE, and a flange that extends radially from said main body and is axially captured to substantially prevent axial displacement of said flange relative to said main body; said seat being contoured for increasing axial flexibility of said seat main body.

26. The valve of claim 25 wherein said contoured seat comprises a radially extending notch that forms a thinner axial portion of said main body adjacent said flange.

27. The valve of claim 26 wherein said captured flange produces a cantilever movement of said main body when the valve is under increased pressure on one side of said ball member.

* * * * *

UNITED STATES PATENT AND TRADEMARK OFFICE
CERTIFICATE OF CORRECTION

PATENT NO. : 6,695,285 B1
DATED : February 24, 2004
INVENTOR(S) : Hotton et al.

It is certified that error appears in the above-identified patent and that said Letters Patent is hereby corrected as shown below:

Column 10,
Line 32, delete "PTFM" and insert -- PTFE --.

Signed and Sealed this

Twentieth Day of December, 2005

JON W. DUDAS
*Director of the United States Patent and Trademark Office*